United States Patent [19]

Kim

[11] 4,272,121
[45] Jun. 9, 1981

[54] STATION WAGON WITH ADJUSTABLE REAR ROOF PANEL

[76] Inventor: Sunyong P. Kim, 535 N. Cahuenga Blvd., Los Angeles, Calif. 90004

[21] Appl. No.: 140,195

[22] Filed: Apr. 14, 1980

Related U.S. Application Data

[63] Continuation of Ser. No. 916,955, Jun. 19, 1978.

[51] Int. Cl.³ .................................................. B60J 7/00
[52] U.S. Cl. ....................................... 296/216; 224/309
[58] Field of Search .............. 296/216, 220, 100, 146, 296/50; 224/309, 328

[56] References Cited
U.S. PATENT DOCUMENTS 4,063,774  12/1977  Hanks .................................. 296/216

FOREIGN PATENT DOCUMENTS 54592   6/1966  Fed. Rep. of Germany .......... 296/216
1431241 1/1966  France ................................... 296/216
347940  5/1931  United Kingdom ................... 296/216

*Primary Examiner*—Robert R. Song
*Attorney, Agent, or Firm*—John T. Matlago

[57] ABSTRACT

A station wagon vehicle or the like having a rear cargo space is provided with a rectangular opening on the rear roof portion thereof. The rectangular opening forms a part of the opening provided when the rear door of the vehicle is opened to gain access to its cargo space. A roof panel which normally covers the rectangular opening is mounted to enable it to be moved forwardly to provide a vertical clearance in the cargo space for objects being hauled therein.

4 Claims, 15 Drawing Figures

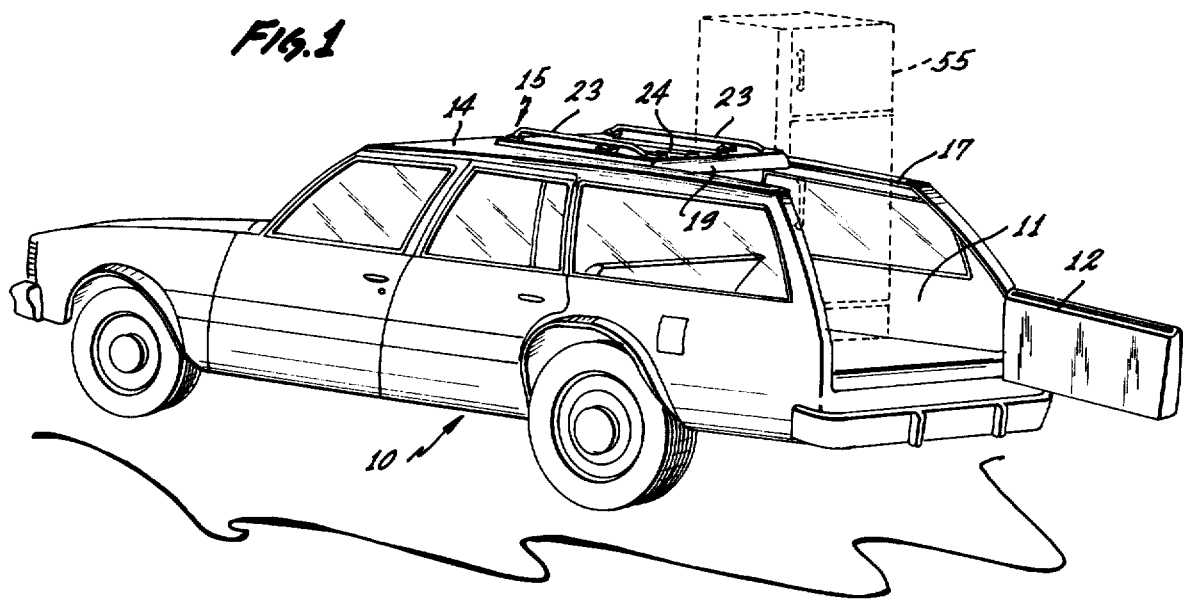
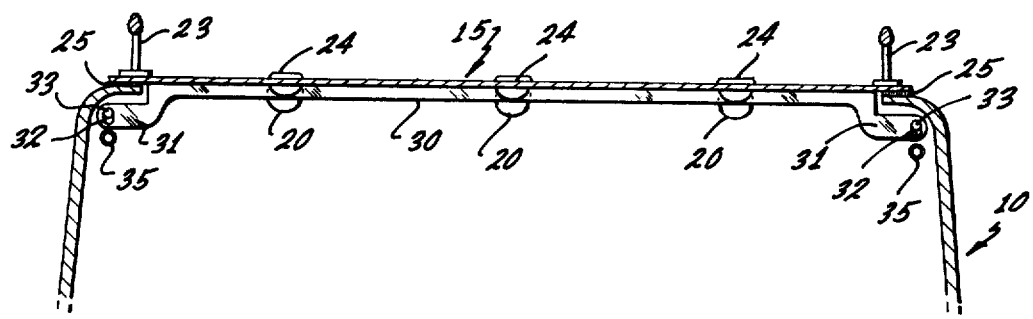
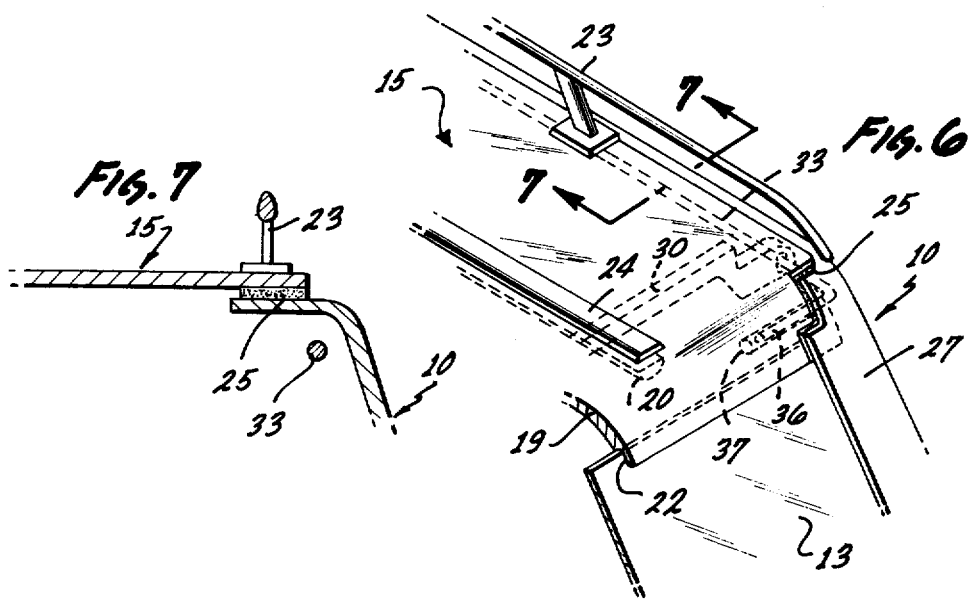

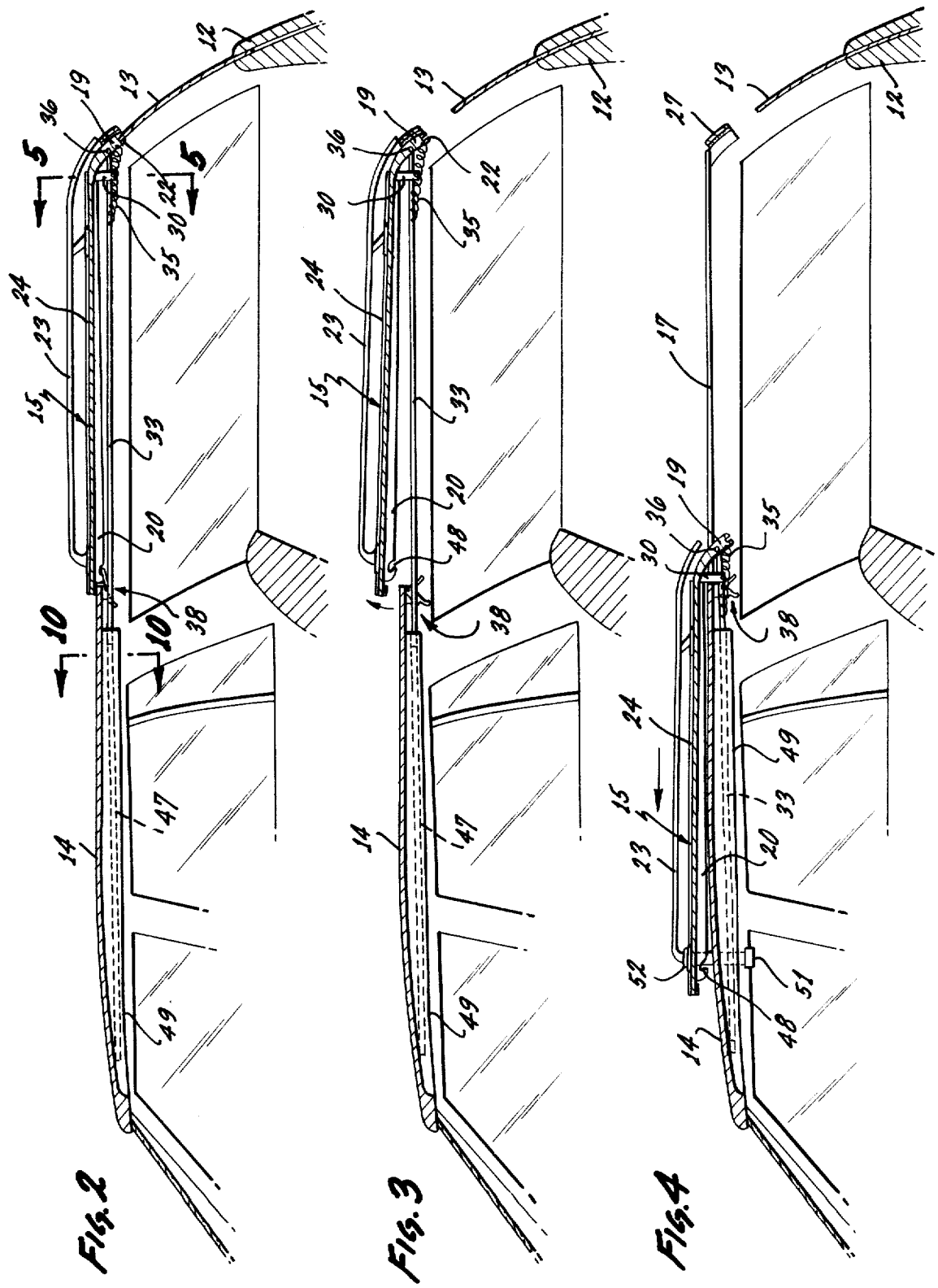

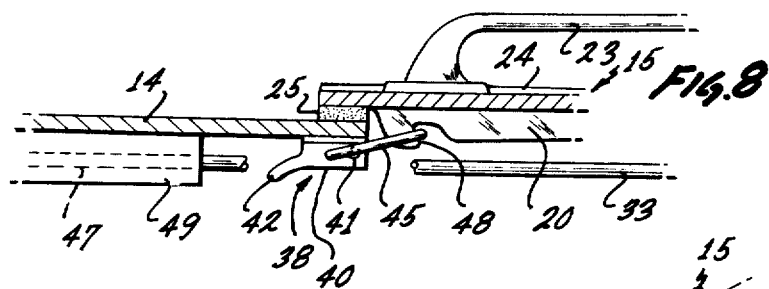
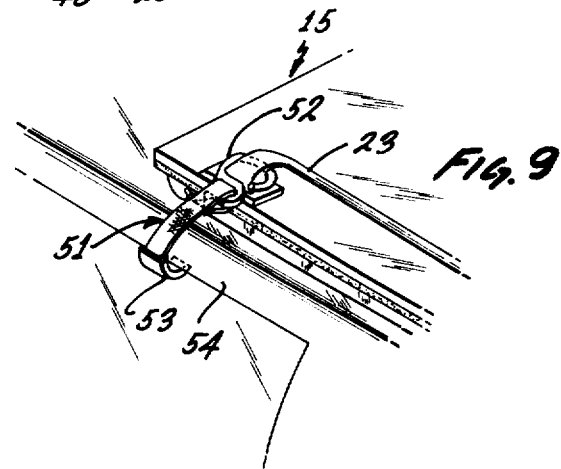
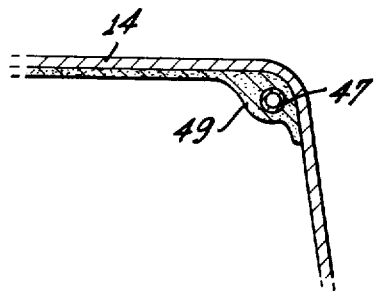
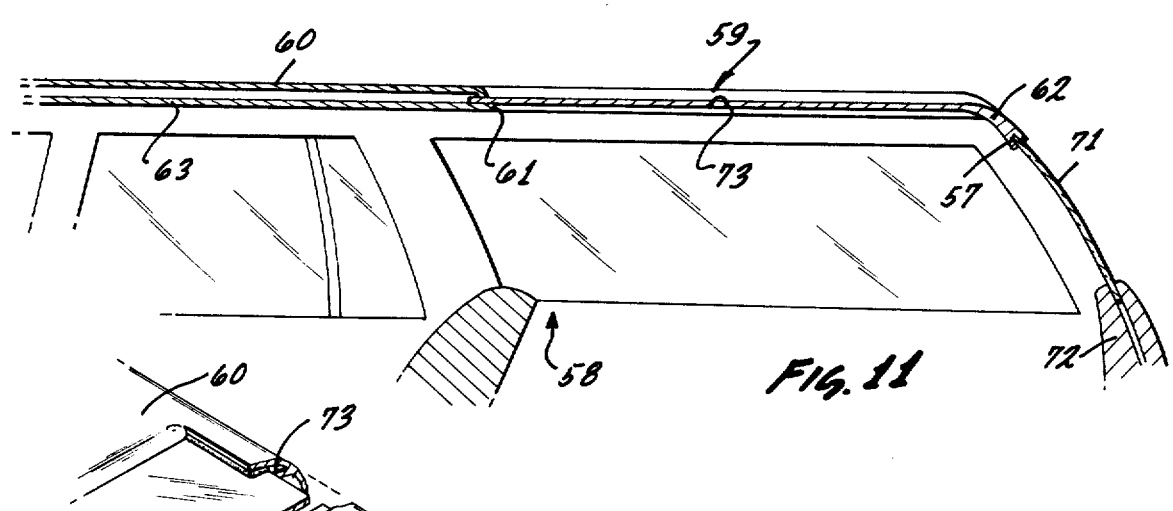
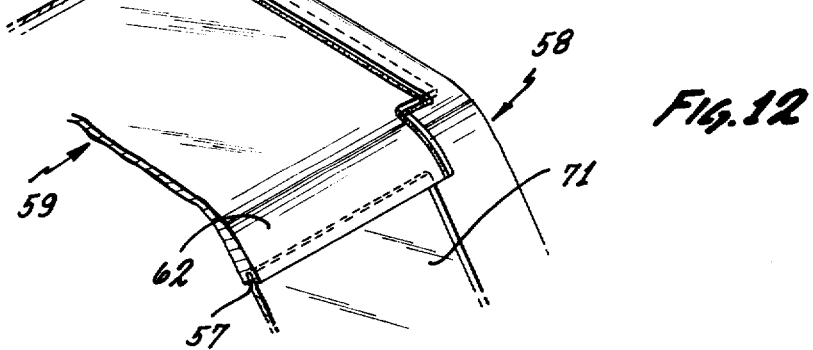

STATION WAGON WITH ADJUSTABLE REAR ROOF PANEL

This is a continuation of application Ser. No. 916,955, filed June 19, 1978.

BACKGROUND AND SUMMARY OF THE INVENTION

This invention relates to a station wagon or similar vehicle having a cargo space in the rear interior thereof, and more particularly to such a vehicle having an adjustable rear roof panel which can be moved forward when needed to provide a vertical clearance opening for objects being carried in the cargo space.

One of the reasons station wagons are so popular is because they provide large rear cargo spaces which are useful for hauling various size bulky objects and pieces of equipment. However, the utility of station wagons for hauling purposes is found to be greatly restricted at times because of the limited height of their cargo spaces.

In accordance with the present invention, a station wagon vehicle or the like having a rear cargo space is provided with a rectangular opening on the rear portion of its roof. The rectangular opening forms a continuation of the opening provided by the rear door of the vehicle when it is opened to gain access to the cargo space. A roof panel is provided for normally covering the rectangular opening. The roof panel is provided with guide support means which enables it to be moved forwardly to uncover the rectangular opening in the roof when it is desired to provide a vertical clearance in the cargo space for objects being hauled therein.

Accordingly, one of the objects of the present invention is to increase the utility of the cargo space of a station wagon vehicle or the like for hauling purposes.

Another object of the present invention is to provide for opening up the rear roof portion of a station wagon to provide a vertical clearance for objects placed into and carried in the cargo space thereof.

Still another object of the present invention is to provide an adjustable roof panel which can be moved forwardly to uncover a rear roof portion of a station wagon wherein the roof panel has baggage carrier rails mounted on the upper surface thereof.

With these and other objects in view, the invention consists in the construction, arrangement and combination of the various parts of the device whereby the objects contemplated are attained as hereinafter set forth, pointed out in the appended claims, and illustrated in the accompanying drawings.

DRAWING SUMMARY

FIG. 1 is an overall perspective view of a large size station wagon embodying an adjustable rear roof panel shown in its open position to provide a vertical clearance for the cargo space in the rear thereof;

FIG. 2 is a longitudinal cross sectional view of the roof of the station wagon showing the adjustable roof panel in its closed position;

FIG. 3 is a longitudinal cross sectional view of the roof of the station wagon showing the adjustable roof panel tilted upwardly upon being unlatched;

FIG. 4 is a longitudinal cross sectional view of the roof of the station wagon showing the adjustable rear roof panel in its open position where it is secured to lie over the front portion of the roof;

FIG. 5 is a transverse cross sectional view of the roof of the station wagon as taken along line 5—5 in FIG. 2;

FIG. 6 is a perspective view of the upper rear corner portion of the station wagon showing the adjustable rear roof panel in its closed position;

FIG. 7 is a fragmentary sectional view as taken along lines 7—7 in FIG. 6;

FIG. 8 is an enlarged cross sectional view showing a latch for securing the roof panel in its closed position;

FIG. 9 is an enlarged perspective view showing a gripping clamp for securing the roof panel in its open position;

FIG. 10 is a fragmentary sectional view as taken along lines 10—10 of FIG. 2;

FIG. 11 is a longitudinal cross sectional view of the roof of a small size station wagon embodying a modified sliding rear roof panel shown in its closed position;

FIG. 12 is a perspective view of the upper rear corner portion of the station wagon showing the sliding roof panel in its closed position;

DESCRIPTION OF PREFERRED EMBODIMENTS

Figure 13:
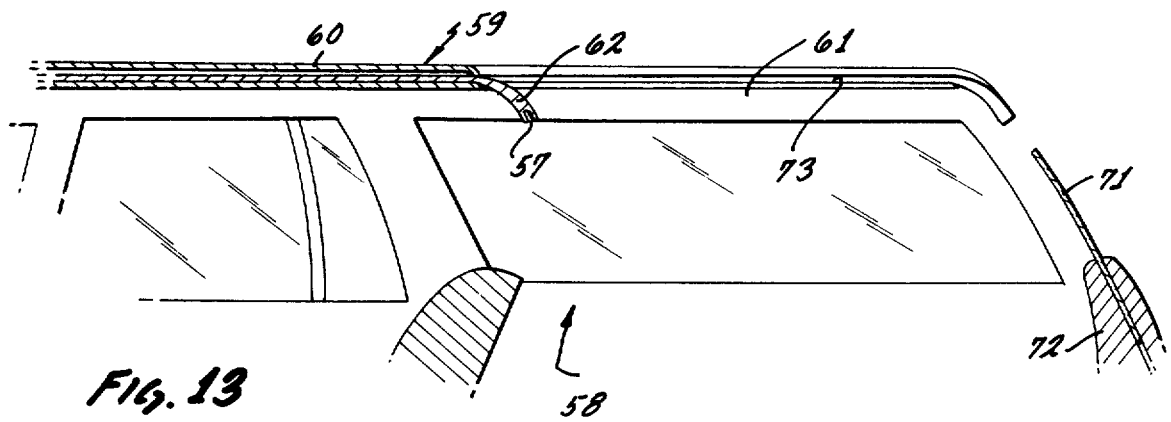
FIG. 13 is a longitudinal cross sectional view of the roof of the station wagon showing the modified sliding roof panel in its open position.

Referring to FIG. 1, a large size station wagon 10 is illustrated with its rear seat folded down to its closed position to provide an area in the rear thereof for hauling cargo. The cargo space 11 is accessable by way of a conventional rear door-gate 12. The door-gate 12 is provided in a conventional manner with hinges so that it can be either opened sidewise, as shown, or with the window lowered, downward so as to provide a load floor extension for easy access to the cargo space 11.

The rear half portion of the roof 14 of the station wagon 10 is effectively removed to form a rectangular opening 17 which extends from one side of the roof to the other and extends rearwardly to become a part of the opening provided on the back of the station wagon when the door-gate is opened.

As illustrated in FIG. 2, the roof rectangular opening 17 is normally covered by a hatch or roof panel 15 structured in accordance with the present invention. The roof panel 15 which may be fabricated from metal or molded of plastic has a substantially flat rectangular upper surface with a downwardly sloping rear portion 19. The roof panel 15 has three laterally spaced ribs 20 on the lower surface thereof. The thickness of each rib 20 tapers down from the front toward the rear thereof. The roof panel 15 has a pair of side rail carrier members 23 mounted on the sides of the upper surface thereof together with a plurality of laterally spaced support members 24. The front and side bottom edges of the roof panel 15 have strips of sealing material 25 secured thereto which normally rest on the front and side edges of the roof rectangular opening 17. When the roof panel 15 is in its closed position with its downwardly sloping rear portion 19 abutting the side body 27 (FIG. 6), the upper edge of the glass plate window 13 on the door-gate 12 fits into a slot 22 on the lower edge of rear portion 19.

As shown in FIG. 5, the roof panel 15 has a transverse support 30 secured on the bottom of the rear thereof. The support 30 has downwardly and outwardly extending arms 31 on either side thereof. Each of the arms 31 is provided with a vertically enlarged opening 32 for a side guide rod 33. Each of the pair of side guide rods 33 has an inwardly bent rear end 36 which is pivotally held in a transverse hole 37 provided on a respective side of the downwardly sloping rear portion 29 of the roof panel 15. Each of the pair of side guide rods 33 has one end of a coil spring 35 attached inwardly of the rear end thereof. The other ends of the coil springs 35 are attached to a respective side of the downwardly sloping rear portion 19 of the rear panel 15. The front ends of the rods 33 are telescopically received in tubes 47 provided on the respective sides of the interior of the front portion of the roof 14. Tubes 47 may be encased in a hard rubber molding 49 or other liner material secured to the sides of the ceiling of the front portion, as shown in FIG. 10. It should now be clear that the action of coil springs 35 causes the front end of the rear panel 15, when freed, to be slightly tilted upwardly with respect to the fixed plane of the pair of side guide rods 33.

As shown in FIG. 8, when the roof panel 35 is in its closed position, it is secured by a latch 38 which comprises a body 40 pivotally mounted on a pin 41 supported below the roof 14. The latch body 40 is laterally provided with a lever 42 on the front end thereof. A U shaped member 45 is pivotally supported on body 40 forwardly of pin 41. A hook 48 is formed on the front end of the center rib 20 provided on the underside of the roof panel 15. Thus, when the lever 42 is pushed upwardly, the pivoting of latch body 40 about pin 41 causes the U shaped member 45 to be pulled forward to tightly engage the hook 48. This holds the rear roof panel 15 in its closed position in which it covers the rectangular roof opening 17.

When it is desired to release the rear roof panel 15 so as to uncover the rectangular opening 17 to provide additional head room in the cargo space, lever 42 of latch 38 is pulled down. This causes latch body 40 to pivot downwardly about its pin 41 and consequently the U shaped member 45 to be pushed back such that it clears the hook 48. As a result of the front end of the rear roof panel 15 being so unlatched, the panel 15 automatically tilts upwardly by the action of the coil springs 35, as shown in FIG. 3. Now then, by lowering the rear window 12 into the door-gate 13, the rear roof panel 15 is further released such that it can be manually or otherwise moved forwardly with its pair of side guide rods 33 advancing into the pair of side tubes 47 provided on the undersides of the front portion of the roof 14, as illustrated in FIGS. 4 and 10.

It should be understood that the tilting of the rear roof panel 15 upwardly at the front thereof by the action of coil springs 35 permits it to be moved forwardly above the front portion of roof 14. In order to hold the roof panel 15 down while in its forward position, a gripping clamp 51, as shown in FIG. 9, is provided on each side of the roof panel 15. Each of the gripping clamps 51 has a hook 52 on the upper end thereof which engages a leg of the side rail carrier member 23 and a cupped lower end 53 shaped to grippingly engage the underside of the upper frame 54 of the front window of the station wagon. It should be noted that the clamps 51 hold down the roof panel 15 against the upward tilting action provided by the coil springs 35.

It should be further noted that the roof panel 15, when moved to its forward open position overlying the front portion of the roof 14, is firmly held against sidewise movements by the guide rods 33 and the gripping clamps 51 such that the rail carrier members 23 are still available for use in carrying baggage.

With the roof panel 15 secured in its forward position, the rectangular opening 17 provides a vertical clearance for objects being carried in the cargo space 11, such as refrigerator 55, for example, as shown in FIG. 1. After the refrigerator or other upright objects have been loaded into the carge space 11, the door-gate 12 can, of course, be closed in the normal manner.

A simplified embodiment of a sliding rear roof panel 59 on the roof 60 of a small station wagon 58 is shown in FIGS. 11, 12 and 13. The rear half portion of the roof 60 is provided with a rectangular opening 61, similarly to the opening 17 in FIG. 1. The roof panel 59 is formed with a relatively flat rectangular upper surface and a downwardly sloping back portion 62, similar to the roof panel 15 (FIG. 2). Since there are no rail carrier members provided on the modified roof panel 59, its sides are simply engagedly supported for movement in grooves 73 provided on the sides of the rectangular opening 61 in the roof. The lower edge of the downwardly sloping back portion 62 of the roof panel 59 is provided with a slot 57 which engages the upper edge of raised window 71 of the rear door 72.

Below the front portion of the roof 60 is a spaced ceiling wall 63 such that when the panel 59 is pulled forwardly it recedes into the space thereby provided below the front portion of the roof, as shown in FIG. 13.

Figure 14:
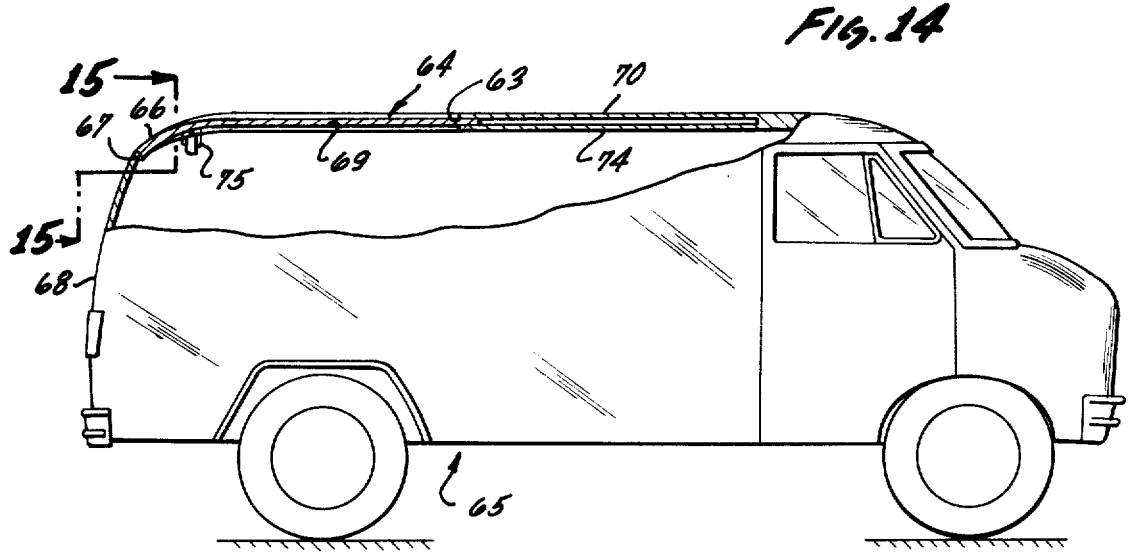
FIG. 14 is a side view of a van type vehicle showing a longitudinal cross sectional view of the roof embodying the modified sliding roof panel in its closed position.
Figure 15:
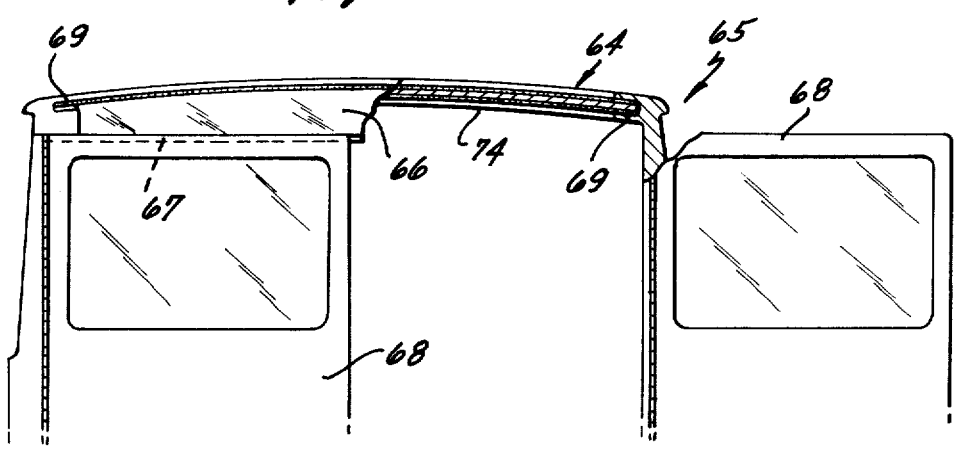
FIG. 15 is a rear view of the van type vehicle of FIG. 14 showing the roof portion and rear panel partly in section.

Referring next to FIG. 14, a van type vehicle 65 is shown having a rectangular opening 63 on the rear half portion of its roof 70. The opening 63 is normally covered by a sliding roof panel 64 generally similar to the sliding roof panel 59 shown for the station wagon in FIG. 11. The roof panel 64 is thus provided with a downwardly sloping rear portion 66 having a shoulder 67 on the bottom edge thereof against which the upper edges of the hinged side doors 68 seat when closed. The roof panel 64 slides in side grooves 69 provided on the sides of the rear portion of the roof structure and recedes, when pulled forward, into the space formed below the front portion of the roof 70 by a wall 74. A latch 75, similar to latch 38 shown in FIG. 8, may be provided to secure the roof panel 64 in its closed position.

While the invention shown and described herein has been adapted to fulfill the objects and advantages previously mentioned as desirable, it is to be understood that the invention is not limited to the specific features shown and described but that the means and configuration herein disclosed are susceptible of modification in form, proportion and arrangement of parts without departing from the principle involved or sacrificing any of its advantages and the invention is therefore claimed in embodiments of various forms all coming within the scope of the claims which follow.

What is claimed is:

1. In a station wagon vehicle or the like having a roof, a rear cargo space, and a rear door;
   the rear portion of said roof provided with a rectangular opening extending rearwardly to form a continuation of the opening provided by the rear door when the latter is opened;

a roof panel covering said rectangular opening, said panel including a downwardly sloping rear portion which engages the upper edge of said rear door when closed; and support means for said roof panel including guide members pivotally attached to the downwardly sloping rear portion thereof and guideways disposed along the bottom of the front half portion of said roof for slideably receiving said guide members whereby said rear panel can be slid forwardly to lie over the surface of the front half portion of said roof.

2. In a station wagon vehicle or the like having a roof, a rear cargo space, and a rear door;

the rear half portion of said roof provided with a rectangular opening extending rearwardly to form a continuation of the opening provided by the rear door when the latter is opened;

a roof panel covering said rectangular opening, said panel including a downwardly sloping rear portion which engages the upper edge of said rear door when closed;

support means for slideably supporting said roof panel for movement toward the front of the roof to uncover said rectangular opening;

said support means including:

a transverse member adjacent the downwardly sloping rear portion thereof;

a pair of side guide rods respectively extending through openings in the sides of said transverse member, said guide rods having bent rear end portions pivotally held in the respective sides of the downwardly sloping rear portion of said roof panel;

a pair of coil springs, each coil spring having one end thereof attached to one said guide rods inwardly of the rear end thereof and the other end thereof attached to the bottom of the downwardly sloping rear portion of said roof panel to provide an upwardly tilting action of said roof panel;

a pair of side guide tubes disposed along the sides of the front ceiling portion of the station wagon for respectively receiving the free front ends of the pair of guide rods; and latch means operable when said roof panel is covering said rectangular opening to hold said roof panel down against the upwardly tilting action of said pair of coil springs;

whereby when said latch means is unlatched said roof panel is tilted upwardly by the action of said pair of coil springs such that it can be moved forwardly over the front portion of the roof while the pair of guide rods telescopically slide into said pair of guide tubes.

3. In a station wagon vehicle or the like as defined in claim 2 wherein gripping clamps are provided for holding said roof panel when in its open position down against the front portion of the roof against the tilting action of said pair of coil springs.

4. In a station wagon vehicle having a roof, a rear cargo space and a rear door;

the rear half portion of said roof provided with a rectangular opening extending rearwardly to form a continuation of the opening provided by the rear door when the latter is opened;

a roof panel covering said rectangular opening, said panel including a downwardly sloping rear portion;

a roof rack comprising a pair of side rail carrier members mounted on the top surface of said roof panel; and support means for said roof panel including guide means having guide members extending along the lengths of the sides thereof and guideways extending along the lengths of the sides of the front half portion of the roof for slideably guiding said roof panel for movement between a closed position in which said roof panel covers the rectangular opening in said roof with its downwardly sloping rear portion engaging the upper edge of said rear door and an open position in which said roof panel lies over the surface of the front half portion of the roof.

* * * * *